(12) United States Patent
Nicoletti

(10) Patent No.: US 6,808,334 B2
(45) Date of Patent: Oct. 26, 2004

(54) CONNECTING SYSTEM FOR MODULAR FURNITURE STRUCTURES

(75) Inventor: Bruno Nicoletti, Calderino di Monte S. Pietro (IT)

(73) Assignee: Work Corporation Inc. S.p.A., Bologna (IT)

(*) Notice: Subject to any disclaimer, the term of this patent is extended or adjusted under 35 U.S.C. 154(b) by 0 days.

(21) Appl. No.: 10/234,049

(22) Filed: Sep. 3, 2002

(65) Prior Publication Data

US 2003/0044228 A1 Mar. 6, 2003

(30) Foreign Application Priority Data

Sep. 3, 2001 (IT) .................................... BO2001A0528

(51) Int. Cl.[7] .............................. F16B 1/00; F16D 3/00
(52) U.S. Cl. ...................................... 403/170; 403/169
(58) Field of Search ................................ 403/169, 170, 403/316, 318, 387, DIG. 13; 248/188, 188.8, 228.6, 229.15, 230.6; 108/153.1

(56) References Cited

U.S. PATENT DOCUMENTS

| | | | | |
|---|---|---|---|---|
| 4,021,973 A | * | 5/1977 | Hegg et al. ...................... 52/36 |
| 4,194,338 A | * | 3/1980 | Trafton ........................ 52/721 |
| 4,641,983 A | * | 2/1987 | Strässle ........................ 403/12 |
| 4,893,959 A | * | 1/1990 | Offenbroich ................ 403/12 |
| 4,941,763 A | * | 7/1990 | Euteneuer ...................... 403/3 |
| 5,209,598 A | * | 5/1993 | Züllig ........................ 403/255 |
| 5,240,089 A | * | 8/1993 | Spera .......................... 182/179 |
| 5,683,197 A | * | 11/1997 | Pihl ........................... 403/170 |
| 5,715,760 A | * | 2/1998 | Frascaroli et al. ............ 108/50 |
| 5,729,948 A | * | 3/1998 | Levy et al. ................. 52/656.9 |
| 5,816,734 A | * | 10/1998 | Wåhlin ....................... 403/362 |
| 5,899,423 A | * | 5/1999 | Albertini ................. 248/188.8 |
| 6,059,322 A | * | 5/2000 | Nagai et al. ............. 285/125.1 |
| 6,106,186 A | * | 8/2000 | Taipale et al. ........... 403/322.4 |
| 6,185,887 B1 | * | 2/2001 | Strassle ..................... 52/282.2 |
| 6,478,501 B1 | * | 11/2002 | Kahl .......................... 403/255 |
| 6,582,149 B1 | * | 6/2003 | Holscher .................... 403/255 |
| 6,584,918 B2 | * | 7/2003 | Lee ........................... 108/155 |

* cited by examiner

*Primary Examiner*—Robert J. Sandy
*Assistant Examiner*—Ruth C. Rodriguez
(74) *Attorney, Agent, or Firm*—William J. Sapone; Coleman Sudol Sapone, P.C.

(57) ABSTRACT

A connecting system for modular furniture structures includes an upright element with outer square cross-section giving the upright element four sides and four corners, featuring a trapezoidal or dovetail section longitudinal groove on each side. The longitudinal grooves gives the upright element longitudinal corners a quasi trapezoidal or dovetail shape. Trapezoidal connection small blocks are slidably inserted into the grooves and "C"-shaped clamps are slidably mounted along the longitudinal corners. Pin rods are fitted to both the trapezoidal connection small blocks and the "C"-shaped clamps by means of a threaded section forming also locking means for fixing the small blocks and clamps along the grooves and the corners. The pin rods have a circular groove all around and are introduced into bored small blocks fastened to furniture complementary structural elements and are fixed by means for threaded dowels set in engagement with the circular grooves.

6 Claims, 2 Drawing Sheets

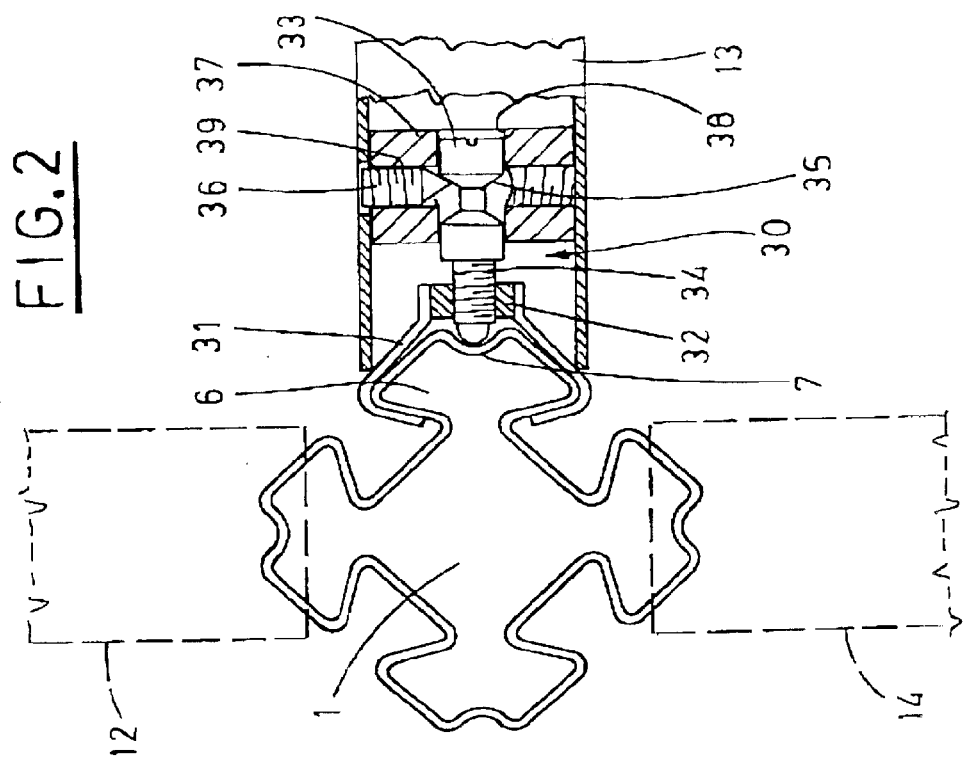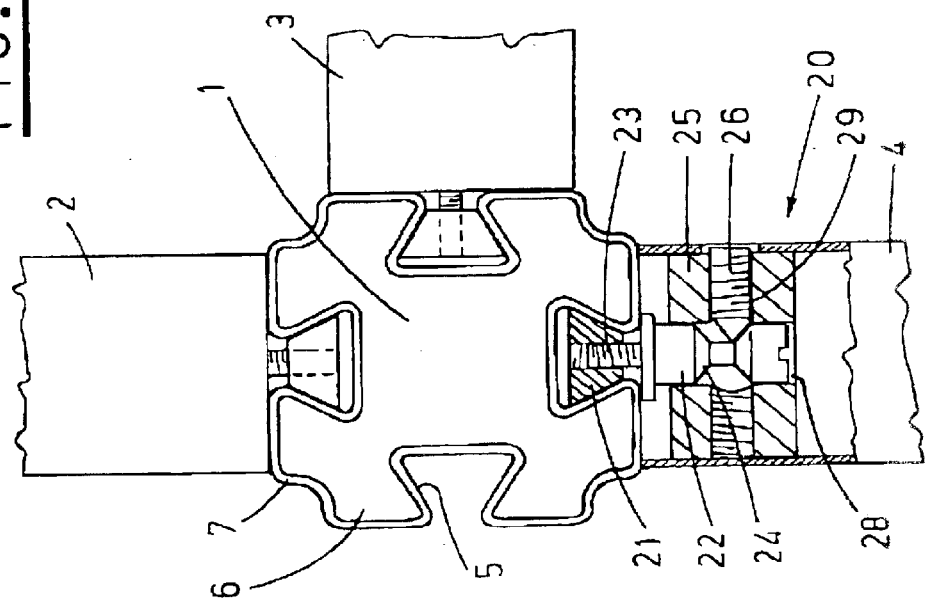

CONNECTING SYSTEM FOR MODULAR FURNITURE STRUCTURES

BACKGROUND OF THE INVENTION

The present invention relates to furniture components, and in particular it relates to desktops, tables, shelves, fitting-carrying wall structures and other components. In further detail, the invention relates to a connecting system for modular furniture elements, which are used for assembling the above-mentioned furniture components.

DESCRIPTION OF THE PRIOR ART

In the furniture production, typically modular structures are produced, which, on one side, allow assembling furniture components with different configurations, and, on the other side, have the advantage that they can be easily transported to the place where they are assembled in easy, quick and stable way.

There are known various systems for the reciprocal connection of the elements used to form the furniture components.

Some of these systems include matching or bridging members made on the furniture elements and aimed at connecting the elements with other mating elements. The connection is definitely stabilized by means of screws or other similar fixing means. To make this operation easier, special holes are suitably provided.

Other known connecting systems include internally bored and threaded bushings, which are fitted into related recesses made along edges of a first series of elements, which are to be connected. Elements of a second series have holes, through which relevant screws are made to pass. The screws are then screwed into the threaded bushings.

All the connecting systems mentioned above, have drawbacks such as low stability and/or rigidity of the connections between the elements, assembling complexity, remarkable amount of time needed for carrying out the assembling operation.

Furthermore, the known connecting systems are often affected by a certain lack of modularity and extension possibilities of the assembly, particularly with reference to the set up of multifunctional structures.

A technical solution disclosed in the Italian patent application BO2001A000307 includes one or more pin rods fastened to a carrier element, for example in axial alignment therewith. Each pin rod has a circular groove all around. The mating elements, which are to be joined with the carrier element, have small blocks mounted thereto, with holes made therein. For instance, the blocks are fastened to the internal part of the mating elements, located in suitable positions.

To carry out the connection operation, the pin rods must be introduced into the holes of the small blocks. Then, threaded dowels are screwed into threaded holes made in the small blocks, for instance at an angle of 90° with reference to the holes receiving the pin rods.

In this way, the connection is stabilized.

SUMMARY OF THE INVENTION

The main object of the present invention is to propose a connecting system for modular furniture structures, in particular desktops, tables, shelves, fitting-carrying wall structures, which system requires a limited number of parts and allows the connection to be carried out in a simple way, though obtaining furniture structures even very complex.

A further object of the present invention is to propose a connecting system for modular furniture structures, by means of which stable and strong connection can be obtained, with a shorter assembling time with reference to the systems currently used.

The above mentioned objects are achieved by a connecting system for modular furniture structures, in particular for writing desktops, tables, fitting-carrying wall structures, including at least one carrier upright element, to which other complementary structural elements are joined by means of connection means, wherein:

this upright element has an external substantially square section with a plurality of sides, and on each side at least one longitudinal groove having cross-section larger at inside of the upright element, and shorter at the relevant outer side of the same upright element;

the above-mentioned grooves give the longitudinal corners of the upright element situated between them a quasi trapezoidal or dovetail shape, with a longer base turned toward inside the upright element and a shorter base turned outwards;

said connection means are slidably mounted within said longitudinal grooves and/or along said longitudinal quasi trapezoidal or dovetail shaped corners and have a shape complementary with said longitudinal grooves and longitudinal quasi trapezoidal or dovetail shaped corners respectively.

BRIEF DESCRIPTION OF THE DRAWINGS

The invention will now be described in more detail with reference to particular, non-limiting embodiments and with reference to the accompanying drawings, in which:

FIG. 1 is a sectional view of an upright element, which incorporates the connecting system subject of the present invention, with other mating elements connected to the upright element so as to form the furniture structure;

FIG. 2 shows the same upright element with the mating elements mounted according to a different configuration;

DESCRIPTION OF THE PREFERRED EMBODIMENTS

Figure 3:
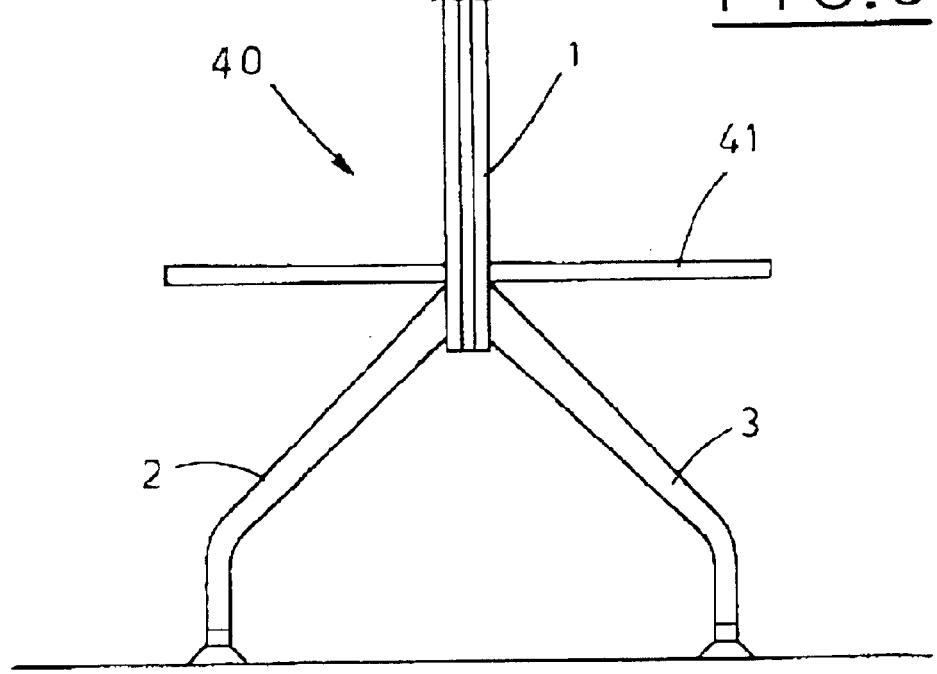
FIG. 3 shows a lateral view of an exemplificative symmetrical structure obtained by means of the connecting system of the present invention.
Figure 4:
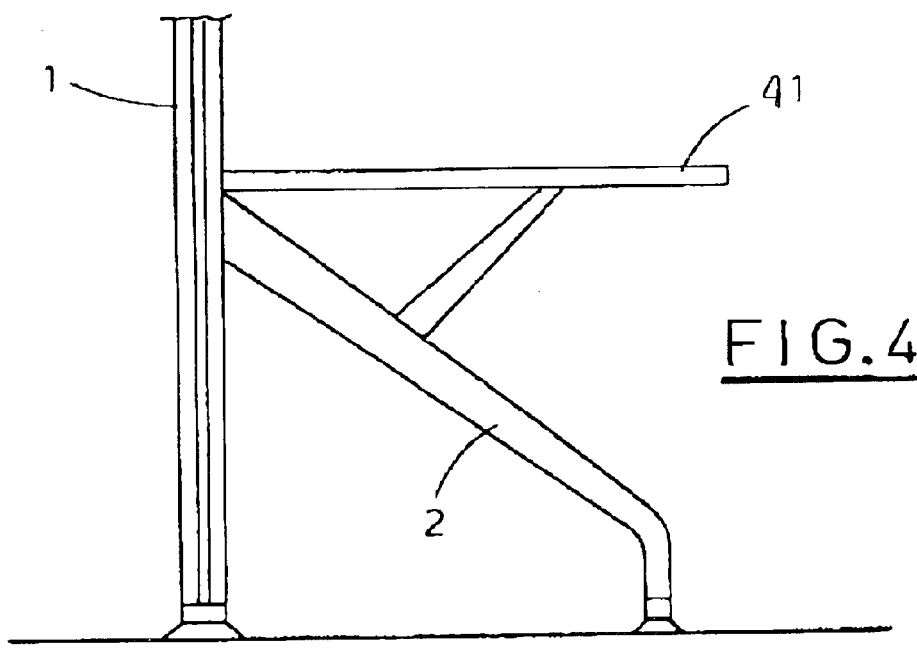
FIG. 4 shows a lateral view of an exemplificative unsymmetrical structure obtained by means of the connecting system of the present invention.

With reference to the above-mentioned figures, a connecting system is herein described. The connecting system is intended for the assembly of modular furniture structures, in particular desktops, tables, shelves, fitting-carrying wall structures.

Generally, the modular furniture structures herein concerned include one or more upright carrying elements 1, to which other complementary structural elements are joined, such as the ones shown as an example in the figures and indicated by numerals 2, 3, 4, 12, 13, 14.

According to the system subject of the present invention, the complementary structural elements are fastened to the upright element by means of connection means 20, 30, which will be described in further detail in the following.

As it appears in FIG. 1, the upright element 1 has a substantially square-profile outer section and on each side there is made a longitudinal groove 5 having trapezoidal or dovetail section, with the shorter base facing outwards.

The four of the thus formed grooves 5 give the longitudinal corners 6 of the upright element, each one situated between two subsequent grooves, a quasi trapezoidal shape, with the longer base located inner with reference to the upright element, and the shorter base facing outwards.

According to the invention, the connection means 20, 30 can take two different configurations.

In a first configuration, the connection means 20 include connection small blocks 21 having trapezoidal or dovetail shape, which can be slidably inserted into the grooves 5.

Anchoring means 22, 23, 24 are made integral to each connection block 21 so as to join them to the complementary structural elements.

In particular, the anchoring means 22, 23, 24 include a pin rod 22 having a circular groove 24 all around and a threaded section fixed to one end of the pin rod. The threaded section is set in engagement with a threaded hole made in the connection small block 21.

Each connection block 21 can be locked along the related groove by locking means 23, which include the same threaded section 23. When the threaded section 23 is screwed the dovetail connection block 21 is pushed against the inclined sides of the relevant dovetail groove 5.

To make easier the thrust action of the threaded section on the external wall of the upright element, a washer or a widened edge can be situated under the end of the pin rod 22 which is fitted with the same threaded section, as it appears in FIG. 1.

The complementary structural elements 2, 3, 4, which are to be connected to the upright element 1, are provided with one or more bored small blocks 25, each one having at least one receiving hole 28 aimed at receiving a pin rod 22.

The location of the bored small blocks is suitably made for a correct reciprocal arrangement of the structural elements with reference to the upright element, in accordance with the usual modes known in the art.

In particular, the bored blocks 25 may be fitted into recesses made in the complementary structural elements, near an edge that is to be joined to the upright element.

Each bored small block 25 has also a threaded hole 29 or preferably two threaded holes, made crosswise to the receiving hole 28 and situated in alignment with the circular groove of the pin rod 22, when the pin rod is inserted into the receiving hole 28.

A threaded dowel 26 is screwed into the threaded hole 29, or into one of the two threaded holes, up to engagement with the circular groove 24, as it appears in FIG. 1.

In this way, by using a plurality of pin rods in co-operation with respective bored small blocks of the complementary structural elements, a stable and rigid connection is obtained between the complementary structural elements 2, 3, 4 and the upright element 1.

The grooves 5 with trapezoidal or dovetail section are arranged at an angle of 90° with respect to one another.

In the second configuration, the connection means, indicated in this case by the reference numeral 30 in FIG. 2, include each one a "C"-shaped clamp 31. In particular, the shape of the clamp matches with the shape of the longitudinal corners 6 having quasi trapezoidal or dovetail section. Therefore, the clamp can fit around the longitudinal corners and can slide therealong.

Also the clamps 31 are equipped with anchoring means 33, 34, 35 for joining them with the complementary structural elements of the modular structure, as shown in FIG. 2.

Also in this case, these anchoring means 33, 34, 35 include a pin rod 33 having a circular groove 35 all around and a threaded section 34 extending from an end of the pin rod.

In this configuration, the threaded section 34 is set in engagement with a thickening 32 of the base of the "C"-shaped clamp 31, which is, for example, parallel to the shorter base of the trapezoidal or dovetail section longitudinal corner 6.

Therefore, the threaded section 34 goes in abutment onto the surface defined by the just-mentioned shorter base formed by the relevant longitudinal corner 6, which is flat, thus forming locking means 32, 34 for the clamp 31 with respect to the upright element 1.

The shorter base 7 of each longitudinal corner 6 can be curved towards the inside of the upright element 1, so as to make the centring of the "C"-shaped clamp easier with respect to the longitudinal corner 6.

As in the previously described case, the complementary structural elements 12, 13, 14 are equipped with one or more bored small blocks 37 having receiving holes 38 for receiving the pin rod 33 therein.

One threaded hole 39, or preferably two threaded holes, made crosswise to the receiving hole 38, are situated in alignment with the circular groove 35 of the pin rod 33, when the pin rod is inserted into the receiving hole 38.

A threaded dowel 36 is screwed into the threaded hole 39, or into one of the two threaded holes 39, up to engagement with the circular groove 35, as it can be seen in FIG. 2.

In this way, a stable connection between the structural elements 12, 13, 14 and the upright element 1 is obtained.

The trapezoidal or dovetail section longitudinal corners 6 are arranged at an angle of 90° with respect to one another and at an angle of 45° with respect to adjacent trapezoidal or dovetail grooves 5. In particular, the symmetry axes of the cross section of the trapezoidal grooves 5, when considered in couples, are disposed at n angle of 45° with reference to the symmetry axes of the cross section of the trapezoidal longitudinal corners 6, when considered in couples.

FIG. 3 shows a symmetric structure, which appears symmetric with reference to the upright element 1. According to this symmetric structure, an upright element 1 is assembled with two feet 2, 3, fixed to the upright element by means of the system described herein above.

Furthermore, an operation desktop 41 is fastened to the upright element by means of the connection means, as described above, which are oriented at an angle of 90° with reference to the connection means used to connect the feet 2, 3.

It is evident that other elements can be connected at a different orientation, i.e. at an angle of 45°, by using a combination of the connection means 20, 30, described above, in both the configurations considered.

The vertical position of the complementary structural elements is not previously fixed, because the connection means 20, 30 can slide with reference to the upright elements, and this fact allows a practically step-less variation of the height level of these elements.

Obviously, also configurations simpler that the ones herein described but using the same inventive concept, are considered included in the invention scope.

For instance, a connecting system could be provided, in which the upright element has only the trapezoidal or dovetail longitudinal grooves 5, into which the connection means 20 are slidably inserted. The cross section of the upright element could also be rectangular.

Otherwise, the connection system for furniture modular structures includes an upright element 1, which has only the longitudinal corners 6 shaped with a trapezoidal or dovetail section, with the longer base turned toward the inside of the upright element 1 and the shorter base facing outwards. The anchoring means 30 are slidably mounted on the trapezoidal longitudinal corners 6.

Furthermore, the longitudinal grooves 5 can take a rectangular shape, with the inner width bigger than the outward opening section. As a matter of fact, it is only necessary that the width of the grooves 5, at the more internal side with reference to the upright element 1, be greater than the outward opening section width, so as to form something like an undercut which allows insertion of the connection small blocks, which in this case take a parallelepiped shape. Also the "C"-shaped clamps must in this case fit to the different shape of the longitudinal corners 6.

The advantages obtained by using the above mentioned system, in both the configurations described and illustrated herein, derive basically from the remarkable simplicity of the connections between the various elements of the assembled structure, which are simple and stable.

In particular, the versatility of the upright element allows the assembly of a large number of structural combinations, which can be easily modified and stably assembled.

The lack of very small parts makes the assembling operation easier and allows previous definite application of all the small components of the system in each single element.

While the preferred embodiment of the invention has been described, it is to be understood that the scope of the protection is not to be limited by such embodiment, but rather by the following claims.

What is claimed is:

1. A connecting system for modular furniture structures, in particular for writing desktops, tables, fitting-carrying wall structures, including at least one carrier upright element, to which other complementary structural elements are joined by means of connection means, wherein:

the upright element has an external substantially square section with a plurality of sides, and on each side at least one longitudinal groove having a cross-section larger at an inside of the upright element, and shorter at an outer side of the upright element;

the at least one longitudinal grooves give longitudinal corners of the upright element situated between them a quasi trapezoidal or dovetail shape, with a longer base turned toward inside the upright element and a shorter base turned outwards;

said connection means being slidably mounted within said longitudinal grooves and/or along said longitudinal quasi trapezoidal or dovetail shaped corners and have a shape complementary with said longitudinal grooves and longitudinal quasi trapezoidal or dovetail shaped corners respectively;

said connection means respectively having locking small blocks having a section matching a section of said longitudinal grooves, said locking small blocks being slidably insertable within said longitudinal grooves and being provided with locking means;

"C"-shaped clamps having a shape matching the shape of said longitudinal quasi trapezoidal or dovetail corners, said "C"-shaped clamps being slidably engagable with said longitudinal corners and being provided with locking means;

anchoring means made integral with said locking small blocks and "C"-shaped clamps, for joining said locking small blocks and "C"-shaped clamps to said complementary structural elements;

said anchoring means each having a pin rod having a circular groove all around and a threaded section extending from an end of the pin rod for engaging with a threaded hole made in said trapezoidal section connection block and in a thickening made in a base of said "C"-shaped clamp, so as to form said locking means for said connection small blocks and said "C"-shaped clamps respectively.

2. The connecting system as in claim 1, wherein said longitudinal grooves have a trapezoidal or dovetail section, with a shorter base turned inwards, and wherein said locking small blocks have a trapezoidal or dovetail section matching the section of said grooves.

3. The connecting system as in claim 1, wherein said complementary structural elements are equipped with at least one bored small block having at least one receiving hole aimed at receiving one of said pin rods, and at least one threaded hole arranged crosswise to said receiving hole and in alignment with said circular groove of said pin rod, when said pin rod is inserted within said receiving hole, with a threaded dowel screwed into said threaded hole up to engagement with said circular groove.

4. The connecting system as in claim 1, wherein an outer corner of said longitudinal quasi trapezoidal or dovetail shaped corners is flattened so as to form the shorter base of the quasi trapezoidal or dovetail section of the longitudinal corners, to define a surface where said locking means act upon.

5. The connecting system as in claim 4, wherein said flattened outer corners are curved inwards with reference to said upright element.

6. A connecting system as in claim 1, wherein a cross section of the at least one longitudinal grooves has symmetry axes, when considered in couples, disposed at an angle of 45° with reference to symmetry axes of a cross section of the quasi-trapezoidal or dovetail longitudinal corners, when considered in couples.

* * * * *